Dec. 11, 1934.    L. P. SHROPSHIRE    1,983,782
EMULSIFIER
Filed Sept. 15, 1932

INVENTOR
Leslie P. Shropshire
BY
Augustus B. Stoughton.
ATTORNEY.

WITNESS:

Patented Dec. 11, 1934

1,983,782

UNITED STATES PATENT OFFICE 1,983,782

EMULSIFIER

Leslie P. Shropshire, Chester, Pa., assignor, by mesne assignments, to Sinclair Refining Company, New York, N. Y., a corporation of Maine Application September 15, 1932, Serial No. 633,331

1 Claim. (Cl. 259—9)

The principal objects of the present invention are to provide a machine which will satisfactorily and rapidly make a stable emulsion of two liquids of which one may be comparatively highly heated in respect to the boiling point of the other without producing foam and froth; to provide an emulsifier which will make a satisfactory soapy emulsion of asphalt of various melting points including a high melting point; to provide a machine for the manufacture of soap and/or alkali, and/or mineral type emulsions that will produce a continuous flow with the same characteristics; to provide a machine of low power consumption; and to provide a machine that will make as a continuous operation an emulsion of asphalt, tar or the like which heated to a working temperature is so hot that when coming in contact with the emulsifying solutions the temperature of the mixture is so near the boiling point of the emulsifying solution that it is likely to cause foam.

Other objects of the invention will appear from the following description at the end of which the invention will be claimed.

Generally stated, the invention comprises an emulsifier consisting of two series of radiating spokes arranged in spaced confronting relation for relative rotation about a common axis, means for rotating said elements, a drum enclosing said rotating elements with limited space between the elements and the wall of the drum, and hollow shafts for introducing fluids into the drum through the centers of the rotating elements, means for applying pressure to the fluids, and an offtake from the drum arranged between the center and ends of the spokes.

The invention also comprises the improvements to be presently described and finally claimed.

Figure 1:
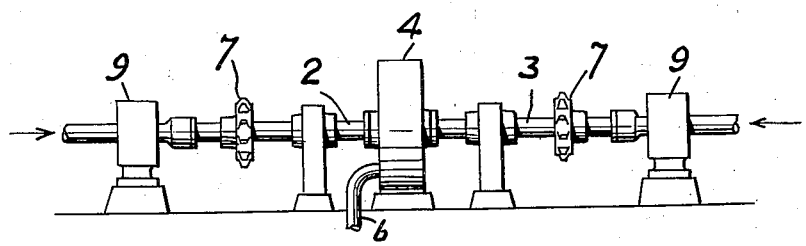

In the following description reference will be made to the accompanying drawing forming part hereof and in which, Figure 1 is an elevational view of an emulsifier embodying features of the invention.

Figure 2:
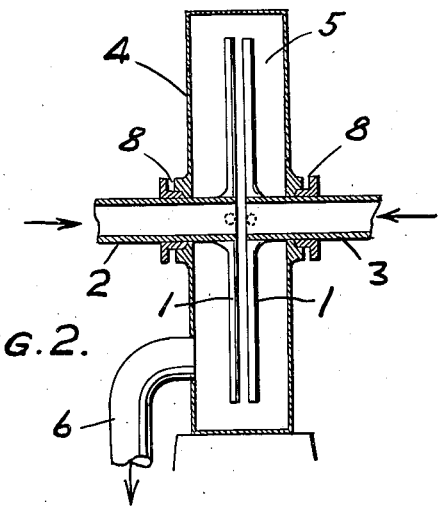
Figure 3:
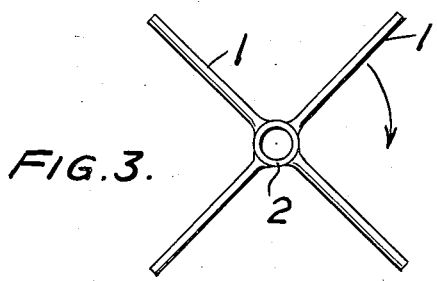

Figure 2 is a sectional view drawn to an enlarged scale and showing the emulsifier, and Figure 3 is a side elevational view showing one of the series of radiating spokes.

Referring to the drawing, a description of one of the two series of radiating spokes will suffice. The spokes 1 radiate from the center of the open end of a revolving pipe. The two series of radiating spokes 1 are arranged in spaced confronting relation for rotation about a common axis. The hollow shaft or pipe 2 appertains to one series of radiating spokes 1 and the hollow shaft or pipe 3 appertains to the other series of radiating spokes 1. 4 is a stationary drum enclosing the rotating elements and there is space 5 between the walls of the drum and the rotating elements. 6 is an offtake from the drum and it is arranged or spaced from the periphery of the drum in order to insure that some of the contents of the drum shall be retained therein or otherwise expressed in order to provide some back pressure. The hollow shafts 2 and 3 are mounted for revolution in suitable bearings and 7 indicate means for revolving the shafts. 8 are stuffing boxes or glands for opposing the escape of fluid or liquid from the interior of the drum 4. 9 indicates pumps for supplying liquid or fluid through the revolving pipes 2 and 3 under pressure.

The respective fluids or liquids are introduced through pipes 2 and 3 at the ends of which they are discharged in opposite directions initiating their mixture and the liquids or fluids in passing from the center of the drum toward the circumference are thoroughly mixed by the confronting series of spaced radiating spokes which are rotated past each other preferably in opposite directions. Upon reaching the offtake 6 the emulsion has been formed and it is led away from the machine for storage and use. The spokes are rectangular in cross section and present a flat face for beating the fluids.

It will be obvious to those skilled in the art to which the invention relates that modifications may be made in details of construction and arrangement and matters of mere form without departing from the spirit of the invention which is not limited to such matters or otherwise than the prior art and the appended claim may require.

I claim:

An emulsifier consisting of two series of radiating spokes arranged in spaced confronting relation for relative rotation about a common axis, means for rotating said elements, a drum enclosing said rotating elements with space between it and said elements, hollow shafts for introducing fluids into the drum through the centers of the rotating elements, means for applying pressure to the fluids, and an offtake from the drum arranged between the centers and ends of the spokes.

LESLIE P. SHROPSHIRE.